June 11, 1957 F. A. GROSS ET AL 2,795,780
RADAR RELAY LINKS
Filed Dec. 21, 1951 2 Sheets-Sheet 2

INVENTORS
FRITZ A. GROSS
WILLIAM M. HALL
HAROLD M. HART
BY Elmer J. Gorn
ATTORNEY

United States Patent Office 2,795,780
Patented June 11, 1957

2,795,780

RADAR RELAY LINKS

Fritz A. Gross, Weston, William M. Hall, Lexington, and Harold M. Hart, Wellesley, Mass., assignors to Raytheon Manufacturing Company, Newton, Mass., a corporation of Delaware Application December 21, 1951, Serial No. 262,724

9 Claims. (Cl. 343—6)

This invention relates to a means for transmitting radar data obtained at the site of the radar set to a remote plan-position indicator located a considerable distance away by means of a single channel radar relay link, and more particularly relates to a novel means for transmitting and receiving antenna rotational information, including antenna angle markers, in conjunction with the usual radar video information and trigger pulses, over said radar relay link.

The ability of the radar set to collect information is greatly dependent upon the location of the antenna. Radar sets are, therefore, located at sites which are advantageous from the point of view of terrain and coverage. On the other hand, the utilization of this information is largely dependent upon the location of the indicators. A control center for receiving and evaluating the information collected by one or more radars is located at a place chosen for its operational convenience. For example, some harbors are so situated that a radar must be located several miles from the desired control location in order to provide coverage of the approach channel, while other harbor channels are so long that a single radar cannot reasonably provide the required coverage. Under such circumstances, a relay system may be used to transmit all radar data to a single convenient control station. The radar data are transmitted from the collecting points to a remote location by means of a radar relay link in such a way that any desired display can be produced at the receiving location in exactly the same way as can be done at the radar itself.

The relay link must be capable of transmitting radar video signals, trigger pulses, signals descriptive of the scanning or azimuthal rotation of the antenna, and antenna angle or position markers for furnishing a check on the accuracy with which the scanning motion is followed. The simultaneous transmission of video signals and angle markers may be accomplished by merely mixing the video signals with the angle marker signals; no separation of these signals is required at the receiver. Trigger pulses can also be mixed with the video signals, since there is no conflict in time, so long as provision is made at the receiving station for separating them and thereby preventing the video signals from occasionally producing a spurious trigger. Since the trigger pulses will transmit at a higher power level than the video signals, the two signals can be separated by means of an amplitude sensitive device. In the past, however, relaying of antenna scanning data, that is, the data indicative of the rotation on the antenna, has been comparatively complicated and involved either a time-sharing method or a method of utilizing one or more subcarriers.

A more simple and effective means for relaying the antenna scanning data consists of some form of electromagnetic rate generator connected via a synchro system to the antenna and producing a sinusoidal audio voltage of frequency (about 40 to 60 C. P. S.) directly proportional to the antenna speed of rotation. This sinusoidal low frequency voltage is mixed at low level with the video and trigger information transmitted via the radar link. At the remote receiver, this low frequency antenna rotational information is recovered by filtering and amplified to a level suitable for driving a 60 cycle synchronous motor. A synchro generator is connected, through a synchro differential, to a synchro motor in the remote plan position indicator. This synchro motor is adapted to drive the sweep coils in the remote P. P. I. indicator.

Even though the radar antenna and remote indicator yoke are driven at the same speed, it is possible that they may not be similarly oriented. In order to phase the remote antenna so that its bearing indications correspond to those at the radar site, a means, including a cam-operated microswitch added to the original radar indicator, provides an electronic angle index in the form of angle marker pulses which are applied to the remote indicator for a few sweeps so that a bright radial dashed line appears on the remote indicator screen every time the antenna passes a given position in azimuth, such as geographical north, and so forth. When the orientation of the antenna system and indicator sweep coil agree, this line appears at zero degrees relative bearing on the indicator screen. If the line does not appear at this point, the synchro differential in the antenna scanning data transmission system is adjusted in a manner described infra, until the proper orientation of the remote unit is obtained. When the cam-operated microswitch is closed, a one shot multivibrator having a period of .01 second is triggered and the output applied to a gate circuit. A free-running multivibrator having a period of 50 microseconds is also applied to the gate. During coincidence of pulses from both said multivibrators, the gate is opened and a short series of pulses having a total duration of .01 second is derived which is applied to the mixer circuit previously referred to and later described in detail.

The trigger pulses for initiating the start of the P. P. I. sweep are combined directly with the video signal and adjusted to twice the video signal amplitude. At the receiving end of the link, this trigger signal is separated from the video by means of a back-biased amplifier or other amplitude sensitive device. The lower frequency antenna rotation signal is separated from the video signals by virtue of the low frequency cutoff characteristic of the video amplifier.

An object of this invention is to provide a novel means for transmitting radar data from a radar set to a remote plan position indicator by means of a single channel radar relay link.

Another object of this invention is to provide a novel means of deriving and combining antenna rotational information and angle marker information for relaying over a radar relay link.

A further object of this invention is to provide a means of relaying information indicative of the rotational motion of a radar antenna by deriving audio signals of frequency dependent upon antenna rotational speed which can be readily mixed with the various forms of video information at the radar set, transmitting said audio signals over a radar relay link and reconverting said signals at the receiving end of the relay link into mechanical motion which is a function of the frequency of said audio signals.

Other objects, features and advantages will suggest themselves to those skilled in the art, and will become apparent from the following description of the invention, taken in connection with the accompanying drawings, wherein:

Fig. 3 is a view showing a tone-wheel generator used in the relay link;

Fig. 6 gives a diagrammatic illustration of a remote plan position indicator used at the remote receiving station.

Figure 1:
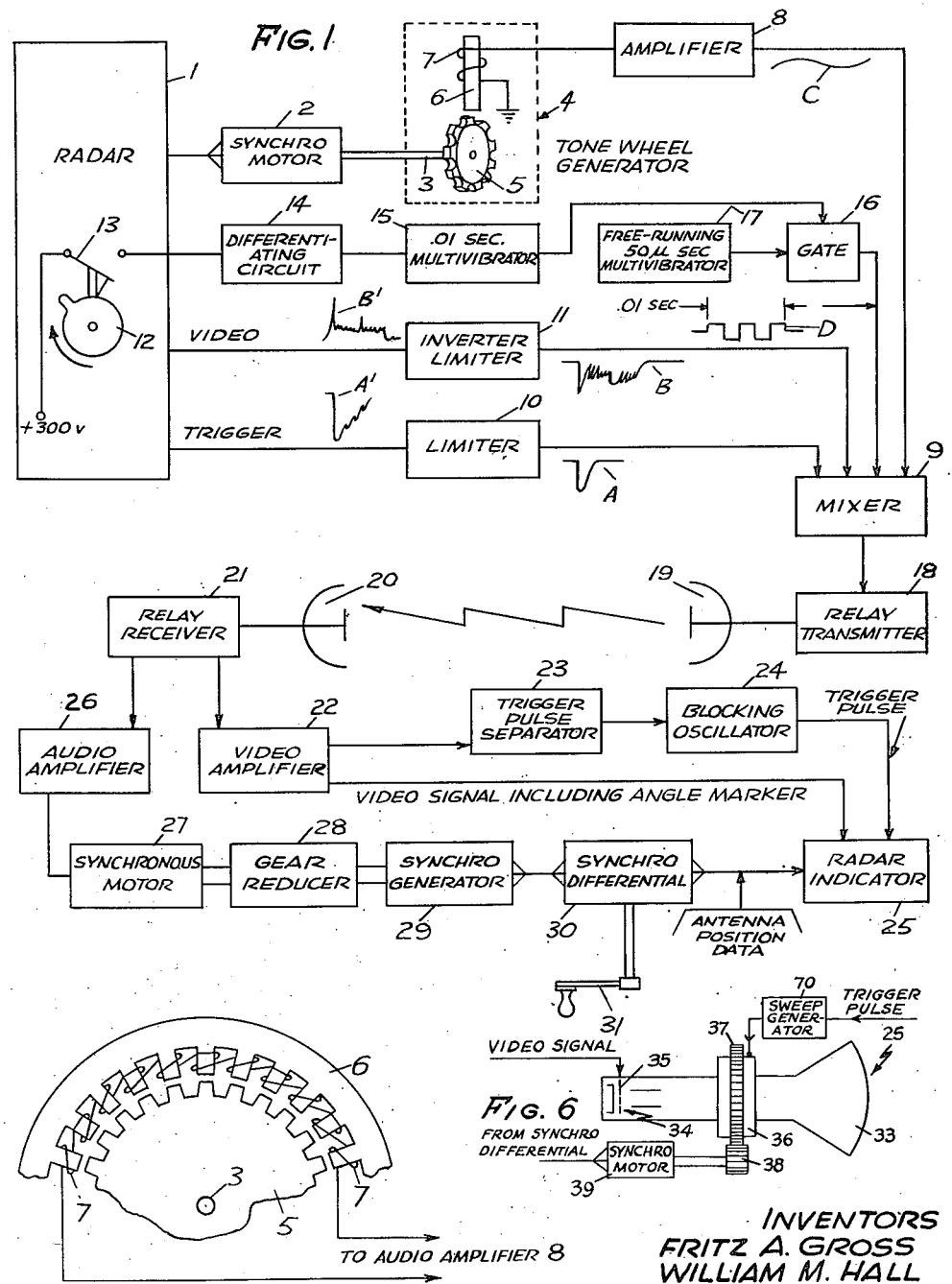
Fig. 1 is a block diagram of an embodiment of a radar relay system according to the invention.
Figure 2:
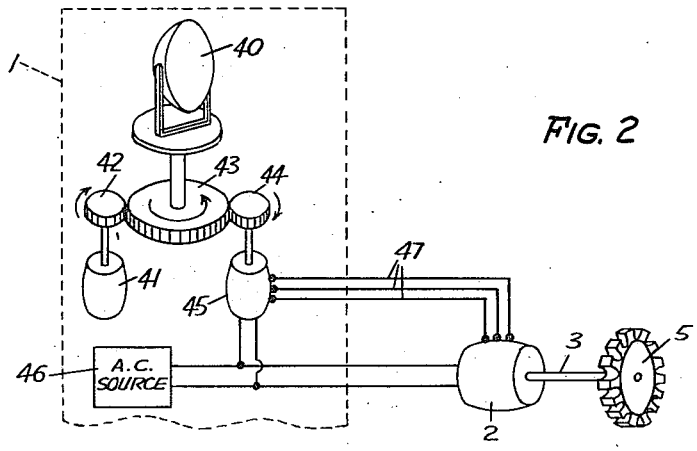
Fig. 2 is a diagrammatic illustration of an antenna servo system included within the radar set.

A conventional radar set 1 includes a plan position indicator and a rotatable antenna. As shown in Fig. 2, the antenna 40 is driven by a conventional drive motor 41. The speed of rotation of antenna 40 is reduced to eight revolutions per minute by a reduction gear assembly 42, 43 comprising a pinion 42 and a gear 43. A 10-speed synchro system is employed wherein the motor of the synchro generator 45 makes ten revolutions for each revolution of the antenna. This is accomplished by a one to ten gearing 43, 44 which connects antenna 40 to the shaft of synchro generator 45 located within radar set 1. The rotor of synchro generator 45, therefore, rotates at a speed of 80 R. P. M. The rotor windings of synchro generator 45 and synchro motor 2 are connected in parallel across an alternating current source 46 while the stator windings of 45 and 2 are interconnected by leads 47, as shown in Fig. 2. The positions of rotor shaft of synchro generator 45 are converted into electrical currents in the stator of the synchro generator. These currents, transmitted by leads 47 to synchro motor 2, cause the latter to turn in correspondence with the rotation of the synchro generator. The 10-speed arrangement gives better driving torque to the deflection coil of the remote indicator and also gives a better degree of bearing accuracy than a 1-speed system. The invention, however, is not to be limited to any particular speed synchro system; any ratio may be used provided a 1 to 1 ratio is reestablished at the remote indicator.

A tone wheel generator or rate generator 4 is mechanically coupled to the rotor 3 of the synchro motor. As shown in Fig. 3, generator 4 comprises a rotatable tone wheel 5 having 40 teeth disposed in uniform manner about its circumference. This tone wheel is caused to rotate in proximity to an arcuate permanent magnet 6 provided with a plurality of projecting segments constituting alternate north and south poles of the magnet. A suitable winding 7 is provided on these poles, the ends of which are connected to an audio amplifier 8. The movement of the projecting teeth of tone wheel 5 across the pole faces produces a periodic change in reluctance of the magnetic circuit of magnet 6. These resultant fluctuations in the magnetic field induce in winding 7 a current of high frequency, equal of the product of the number of poles and the speed of rotation to the tone wheel. A substantially sinusoidal voltage C equal to $$\frac{40 \times 8 \times 10}{60}$$

or 53.3 cycles per second is generated by the rate generator. The output of rate generator 4 is amplified by amplifier 8 and applied to a mixer circuit 9, in a manner to be described infra.

The trigger pulse A' from the transmitter portion of radar set 1 is quite large, being of the order of 150 volts. In order not to swing the transmitter beyond the allocated frequency channel it is necessary to limit the amplitude of this voltage. Each trigger pulse is characterized by a sharp leading edge and the presence of considerable hash. To clear up the pulse and to reduce the amplitude thereof to a reasonable value for mixing with the other pulses of the radar system, the trigger pulses are applied to a limiter circuit 10 which is so biased as to remove all the hash and all except the most negative portion of the pulses.

A resulting trigger pulse A having an amplitude of the order of one volt is obtained at the output of limiter 10 and applied to mixer 9. The leading edge of trigger pulse A has a time duration of approximately 0.1 microsecond so that a transmitter band width of approximately 10 mc. is necessary to properly reproduce this pulse. The video pulses B' from the receiving portion of radar set 1 are applied to an inverter-limiter 11 which inverts the positive-going video pulses and limits the video signals so that they will not reach the amplitude of the trigger pulse and be passed by trigger pulse separator 23 as a false trigger. The explanation of trigger pulse separator 23 will be given later. These limited and inverted video pulses P are applied to mixer 9.

As previously recited, an angle index is provided once during every revolution of the antenna by brightening the cathode ray tube of the remote indicator for a few sweeps so that a bright narrow dashed line is produced at a given azimuth. A cam 12 mounted, for example, on the rotating deflecting yoke of the radar indicator operates a fast-closing microswitch 13 once during each revolution of the radar antenna to suddenly apply a voltage of approximately 300 volts positive to a conventional one-shot multivibrator 15 for a period of .01 second. The transient voltage resulting from the sudden closure of microswitch 13 is first differentiated in a circuit 14 having a relatively low time constant (approximately 100 microseconds) to provide a sharp positive pulse for triggering the multivibrator. The output of multivibrator 15 is applied to a gating circuit 16 together with the output of a free-running multivibrator 17 having a period of 50 microseconds. The gate is closed except during the coincidence of applied pulses from multivibrators 15 and 17, whereupon a series of pulses D fifty microseconds long are applied to mixer 9 for a period of about .01 second. Adjustable multivibrator 15 is set to have a period of approximately .01 second so that the width of the angle marker will be about ⅓° on the remote indicator screen. These pulses produced by closure of microswitch 13 generate a video signal or angle marker to mark the bearing location at the remote indicator.

Figure 4:
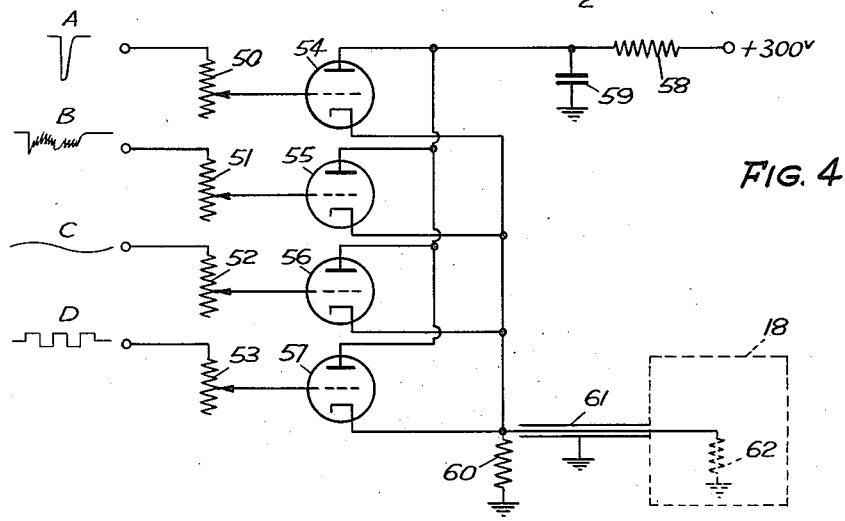
Fig. 4 is a circuit diagram of the mixer circuit of the relay transmitting station.

A detailed description of mixer 9 will now be given. Referring to Fig. 4, the trigger pulses, video signals, angle marker pulses and sinusoidal scanning signals are each applied through individual potentiometers 50—53 to the respective grids of four cathode followers 54 to 57 connected in parallel.

The plates of tubes 54 to 57 are tied together and connected through a dropping resistor 58 to the positive terminal of a source of direct current voltage of approximately 300 volts. A relatively large condenser 59 is connected between the plates and resistor 58. The cathodes are connected by way of a cable 61 to the input of relay transmitter 18. The cable 61 is terminated within the relay transmitter 18 in a resistance, shown as 62 in Fig. 4, of 50 ohms. A resistor 60 of about 400 ohms is connected between the cathodes and ground to provide a return for the cathodes if the mixer becomes disconnected from relay transmitter 18. This resistor 60 is not necessary to the operation of the circuit and is included merely as a protection for the tubes. The individual potentiometers are varied until the amplitude of the sinusoidal scanning signal, angle markers, video signals and trigger pulses at the output of mixer 9 are approximately 0.15 volt, 0.55 volt, 0.55 volt, and 1.11 volts, respectively. These voltage values are merely illustrative and the invention is not to be limited thereto. The potentiometer 50 in the trigger portion of mixer 9 is adjusted to give a voltage output which is approximately twice that of the video signal maximum. Because of the very low impedance in the output of mixer 9, intermodulation effects in the mixer network are of no practical consequence.

Figure 5:
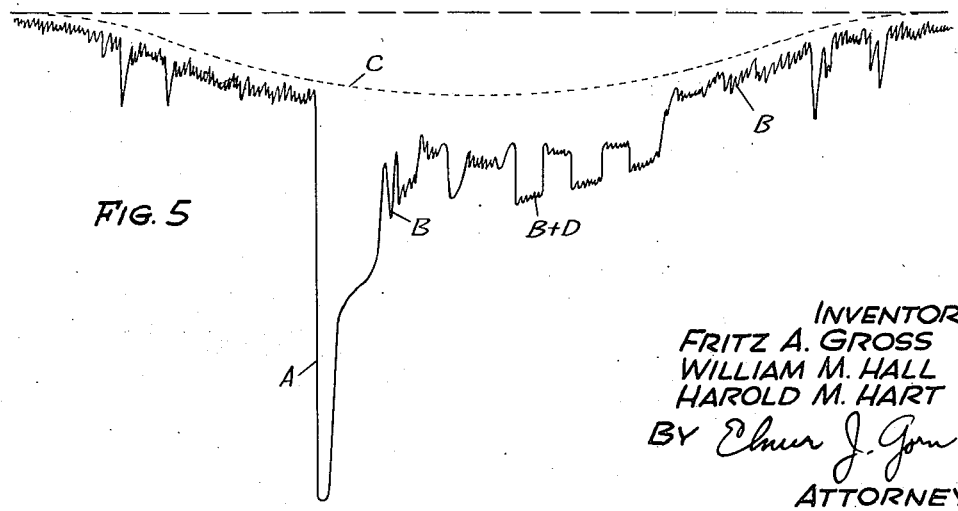
Fig. 5 is a representation of the composite signal appearing at the output of the mixer circuit shown in Fig. 4.

The composite signal appearing at the output of mixer 9 is shown in Fig. 5. The signal as shown is necessarily exaggerated, as regards both amplitude and phase, in order to clearly show the relation between signals A, B, C and D. The composite wave is negative with respect to ground reference level, shown in Fig. 5 as a dashed line. Superimposed on the sinusoidal audio frequency wave C, shown as a dotted wave form in the interest of clarity, are the trigger pulses A, video pulses B and angle marker pulses D upon which video pulses are superimposed, as shown by (B+D). The sinusoidal voltage C varies from ground potential to approximately 0.15 volt negative. The negative angle marker pulses and the maximum swing of the video signals B which are superimposed on wave form C are each approximately 0.5 volt while the trigger pulse is adjusted to a value of approximately one volt.

The composite signal from the mixer is amplified in transmitter 18 and used to vary the transmitter frequency in accordance with the amplitude of the various signals. The output of transmitter 18 is radiated via transmitting antenna 19 and picked up at the remote stations of the relay link by a receiver 21 including a conventional receiving antenna 20.

The output of receiver 21 is connected to a video channel and an audio channel. The video channel comprises amplifier 22 including a simple filter network so designed as to reject the frequency band below approximately 85 C. P. S. The over-all frequency response of the video amplifier is approximately 85 C. P. S. to 5 mc. The output of video amplifier 22 is applied directly to plan position indicator 25 and to a trigger pulse separator 23. The video signals and angle markers from video amplifier 22 are applied directly to the intensity grid 35 of the remote P. P. I. indicator 25.

As shown in Fig. 6, the remote radar indicator 25 includes a cathode-ray tube 33 having an electron gun 34 mounted at one end thereof for projecting a beam of electrons through a control grid 35 and a rotatable deflecting yoke 36 to a fluorescent screen at the opposite enlarged end of said tube. The sweep coil mounted on yoke 36 is rotated by means of an annular or ring gear 37 affixed to yoke 36 and meshed with driving gear 38. The gearing is so arranged that the angular velocity of yoke 36 is equal to that of antenna 40 in Fig. 2.

The trigger pulses passed by video amplifier 22 are applied to a pulse separator 23 comprising some sort of amplitude sensitive means. Since the amplitude of the trigger pulse has been adjusted to twice the video signal amplitude, the pulse separator may comprise a back-biased amplifier or similar device which will pass only signals exceeding a predetermined amplitude, in this case, more than 0.55 volt. The separated trigger pulses are next applied to blocking oscillator 24 to produce sharp trigger pulses which are then applied to the sweep circuit 70 of the remote P. P. I. indicator to initiate the P. P. I. sweep.

The audio channel at the output of receiver 21 comprises an audio amplifier 26 which is designed to pass a frequency band of from 10 to 80 C. P. S. A conventional audio amplifier may be used whose frequency response is severely limited by inserting a large condenser across the plate load resistor of one or more of the stages. The output of audio amplifier 26 is applied to a standard 1/50 hp., 115-volt, 60 cycle, synchronous motor 27 whose speed at 60 C. P. S. is 1800 R. P. M. The speed of the synchronous motor is directly proportional to the frequency of the electrical energy supplied thereto. For example, if the frequency of generator 4 is 53.3 C. P. S., the speed of motor 27 will be $$\frac{53.3}{60} \times 1800 = 1600 \text{ R. P. M.}$$

The shaft of motor 27 is connected to a reduction gear assembly 28 having a 20-to-1 ratio. The shaft of synchro-generator 29 which is connected to reduction gear 28 is thus made to turn at 80 R. P. M. Synchro generator 29 is connected to the stator of a synchro differential (differential selsyn generator) 30. The rotor of synchro differential 30 is connected to the stator of a conventional synchro motor 39 located within remote indicator 25. The effect of synchro differential 30 in the control system is to cause the synchro motor 39 in the indicator to turn to an angle equal to the relative shift between the axis of the synchro differential motor and the direction of the synchro differential stator field. The rotor of the synchro motor is connected to the driving gear 38 of the rotating sweep coil assembly of the remote indicator to drive yoke 36 about the neck of the remote indicator in synchronism with the antenna motion. By means of a hand crank 31 connected to the synchro differential rotor, the latter may be shifted relative to the direction of the stator field so as to manually position the angle marker lines to appear on the indicator at some desired "zero" position (usually at the top of the indicator screen).

This invention is not limited to the particular details of construction, materials and processes described, as many equivalents will suggest themselves to those skilled in the art. It is accordingly desired that the appended claims be given a broad interpretation commensurate with the scope of the invention within the art.

What is claimed is:

1. A radar relay link comprising a radar set including a rotary antenna and an indicator, said radar set including means for deriving video pulses and trigger pulses, a switch associated with said indicator and adapted to close once during each revolution of said antenna, means responsive to the closure of said switch to generate a first pulse, a source of second pulses, a gating circuit operative when said first and second pulses are simultaneously applied thereto to pass said second pulses for the duration of said first pulse, a first synchro system geared to said antenna and adapted to drive a rate generator whose output is a voltage of frequency proportional to the speed of rotation of said antenna, a single mixer for combining said video pulses, said trigger pulses, said second pulses and said voltage to produce a composite signal, means for transmitting said composite signal to a remote location, means at said remote location for receiving said composite signal, first selective means connected to said receiving means for separating said voltage from the remainder of said composite signal, a remote indicator having rotatable sweep coils, remote control means including a synchronous motor and second synchro system and responsive to said voltage for causing rotation of said sweep coils in synchronism with the rotation of said antenna, second selective means connected to said receiving means for passing only said remainder of said composite signal, amplitude selective means connected to said second selective means for separating said video pulses and said second pulses from said trigger pulses, and connections from said amplitude selective means to said remote indicator.

2. A radar relay link comprising a radar set including a rotary antenna and a plan position indicator, said radar set including means for deriving video pulses and trigger pulses, a switch associated with said indicator and adapted to close once during each revolution of said antenna, means responsive to the closure of said switch to generate a first pulse, a source of second pulses, a gating circuit operative when said first and second pulses are simultaneously applied thereto to pass said second pulses for the duration of said first pulse, a first synchro system geared to said antenna and adapted to drive a rate generator whose output is an audio voltage of frequency proportional to the speed of rotation of said antenna, a single mixer for combining said video pulses, said trigger pulses, said second pulses and said audio voltage to produce a composite signal, means for transmitting said composite signal to a remote location, receiving means at said remote location for receiving said composite signal, first selective means at said remote location for separating said audio voltage from the video portion of said composite signal, a remote plan position indicator having rotatable sweep coils, remote control means including a synchronous motor and a second synchro system and responsive to said audio voltage for causing rotation of said sweep coils, second selective means at said remote location for passing only the video portion of said composite signal, amplitude selective means at said remote location connected to said second selective means for separating said video pulses and said second pulses from said trigger pulses, and connections from said amplitude selective means to said remote plan position indicator.

3. A radar relay link comprising a radar set including a rotary antenna and a plan position indicator, said radar set including means for deriving video pulses and trigger pulses, a switch associated with said indicator and adapted to close once during each revolution of said antenna, means responsive to the closure of said switch to generate a first pulse, a source of second pulses, a gating circuit operative when said first and second pulses are simultaneously applied thereto to pass said second pulses for the duration of said first pulse, a first synchro system geared to said antenna and adapted to drive a rate generator whose output is an audio voltage of frequency proportional to the speed of rotation of said antenna, a single mixer for combining said video pulses, said trigger pulses, said second pulses and said audio voltage, means for transmitting said combined signal to a remote location, receiving means at said remote location for receiving said combined signal, first selective means for separating said audio voltage from the video portion of said combined signal, a remote indicator having rotatable sweep coils, a synchronous motor energized by said audio voltage and whose speed is proportional to the frequency of said voltage, a second synchro system having its input connected to said synchronous motor, mechanical coupling from the output of said second synchro system to said remote indicator sweep coils for effecting rotation of the latter, second selective means for passing only the video portion of said combined signals, amplitude selective means connected to said second selective means for separating said video pulses and said second pulses from said trigger pulses, and connections from said amplitude selective means to said remote plan position indicator.

4. A radar relay link comprising a detecting and transmitting station including a rotating antenna and productive of video information together with trigger pulses of a given repetition rate, a remote receiving station including an indicator having rotatable deflection means, means responsive to the rotation of said antenna for producing a single substantially sinusoidal audio frequency periodic signal independent of said repetition rate and whose frequency is proportional to the speed of rotation of said antenna, means for superimposing said video information and said trigger pulses upon said periodic signal as an alternating base to derive a composite output signal, means for transmitting said composite output signal to said remote receiving station, means at said receiving station for separately recovering said periodic signal, and control means responsive to said received periodic signal for rotating said indicator deflection means in synchronism with said antenna.

5. A radar relay link comprising a detecting and transmitting station including a rotating antenna and productive of video information together with trigger pulses of a given repetition rate and angle marker pulses indicative of a predetermined position of said antenna in azimuth, a remote receiving station including an indicator having rotatable deflection means, means responsive to the rotation of said antenna for producing a single substantially sinusoidal unmodulated audio frequency periodic signal independent of said repetition rate and whose frequency is proportional to the speed of rotation of said antenna, means for superimposing said video information, said trigger pulses, and said angle marker pulses upon said audio frequency signal as an alternating base to derive a composite signal, means for transmitting said composite signal to said remote receiving station, frequency sensitive means at said receiving station for separately recovering said audio frequency signal, and control means responsive to said received audio frequency signal for rotating said indicator deflection means in synchronism with said antenna.

6. A radar relay link comprising a detecting and transmitting station including a rotating antenna and productive of video information, trigger pulses of a given repetition rate and angle marker pulses indicative of a predetermined position of said antenna in azimuth, a remote receiving station including an indicator having rotatable deflection means, means responsive to the rotation of said antenna and producing a single substantially sinusoidal unmodulated audio frequency signal independent of said repetition rate and whose frequency is proportional to the speed of rotation of said antenna, means for superimposing said video information, said trigger pulses and said angle marker pulses upon said audio frequency signal as an alternating base to produce a composite signal, said means for superimposing comprising only a single mixer circuit to which said video information, said trigger pulses and said signal are directly applied, means at said transmitting station for radiating said composite signal, means at said receiving station for receiving said composite signal radiated by said transmitting station, means at said receiving station for separately recovering said audio frequency signal from said composite signal, and means responsive to said recovered audio frequency signal for rotating said indicator deflection means in synchronism with said antenna.

7. A radar relay link comprising a detecting and transmitting station including a rotating antenna and productive of video pulses, trigger pulses of a given repetition rate and angle marker pulses indicative of a predetermined position of said antenna in azimuth, a remote receiving station including an indicator having a rotatable deflection means, means responsive to the rotation of said antenna for producing a single substantially sinusoidal unmodulated audio frequency periodic signal independent of said repetition rate and whose frequency is proportional to the speed of rotation of said antenna, means for superimposing said video pulses, said trigger pulses and said angle marker pulses upon said audio frequency signal as an alternating base to produce a composite signal, energy radiating means at said transmitting station for producing a carrier wave upon which said composite signal is superimposed, means at said receiving station for receiving said carrier wave and for detecting said composite signal, frequency sensitive means at said remote station for separately recovering said audio frequency signal from said composite signal, means responsive to said recovered audio frequency signal for rotating said indicator deflection means in synchronism with said antenna, and amplitude sensitive means for separating said angle marker and video pulses from said trigger pulses prior to application of said pulses to said indicator.

8. A radar relay link comprising a radar set including a rotary antenna and an indicator, said radar set including means for deriving video pulses and trigger pulses, a switch associated with said indicator and adapted to close once during each revolution of said antenna, means responsive to closure of said switch for generating a first pulse, means including a rate generator mechanically coupled to said antenna for deriving a single unmodulated audio frequency voltage of frequency proportional to the speed of rotation of said antenna, a single mixer for combining said video pulses, said trigger pulses, said first pulses and said voltage to produce a composite signal, means for transmitting said composite signal to a remote location, means at said remote location for receiving said composite signal, first selective means connected to said receiving means for separating said voltage from the remainder of said composite signal, a remote indicator having rotatable sweep coils, remote control means responsive to said voltage for effecting rotation of said sweep coils in synchronism with the rotation of said antenna, second selective means connected to said receiving means for passing only said remainder of said composite signal, amplitude selective means connected to said second selective means for separating said video pulses and said first pulses from said trigger pulses, and connections from said amplitude selective means to said remote indicator.

9. A radar relay link comprising a radar set including a rotary antenna and an indicator, said radar set including means for deriving video pulses and trigger pulses, a switch associated with said indicator and adapted to close once during each revolution of said antenna, means responsive to the closure of said switch to generate a first pulse, a first synchro system geared to said antenna and adapted to drive a rate generator whose output is a voltage of frequency proportional to the speed of rotation of said antenna, a single mixer for combining said video pulses, said trigger pulses, said first pulses and said voltage to produce a composite signal, means for transmitting said composite signal to a remote location, means at said remote location for receiving said composite signal, first selective means connected to said receiving means for separating said voltage from the remainder of said composite signal, a remote indicator having rotatable sweep coils, remote control means including a synchronous motor and second synchro system and responsive to said voltage for causing rotation of said sweep coils in synchronism with the rotation of said antenna, second selective means connected to said receiving means for passing only said remainder of said composite signal, amplitude selective means connected to said second selective means for separating said video pulses and said first pulses from said trigger pulses, and connections from said amplitude selective means to said remote indicator.

References Cited in the file of this patent

UNITED STATES PATENTS

| | | |
|---|---|---|
| 2,412,670 | Epstein | Dec. 17, 1946 |
| 2,506,766 | Bartelink | May 9, 1950 |
| 2,519,935 | Smith et al. | Aug. 22, 1950 |
| 2,547,945 | Jenks | Apr. 10, 1951 |
| 2,552,172 | Hawes | May 8, 1951 |
| 2,624,043 | Gerwin et al. | Dec. 30, 1952 |
| 2,626,390 | Duke | Jan. 20, 1953 |